(12) United States Patent
Sjursen et al.

(10) Patent No.: US 6,444,173 B1
(45) Date of Patent: Sep. 3, 2002

(54) METHOD OF MOVING AND DETECTING FLUID IN A MICROFLUIDIC DEVICE

(75) Inventors: Walter Paul Sjursen, Washington Crossing, PA (US); Kerry Dennis O'Mara, Lambertville, NJ (US)

(73) Assignee: Orchid Biosciences, Inc., Princeton, NJ (US)

( * ) Notice: Subject to any disclaimer, the term of this patent is extended or adjusted under 35 U.S.C. 154(b) by 0 days.

(21) Appl. No.: 09/351,207

(22) Filed: Jul. 9, 1999

(51) Int. Cl.[7] .............................. G01N 27/26; B01L 3/00
(52) U.S. Cl. .................... 422/100; 204/600; 422/82.01; 422/82.02; 422/102
(58) Field of Search ........................ 422/82.01, 82.02, 422/100, 102, 99, 81, 82; 204/600

(56) References Cited

U.S. PATENT DOCUMENTS

| 4,530,029 A | 7/1985 | Beristain |
| 5,180,288 A | 1/1993 | Richter et al. |
| 5,262,127 A | 11/1993 | Wise et al. |
| 5,282,942 A | 2/1994 | Herrick et al. |
| 5,332,469 A | 7/1994 | Mastrangelo |
| 5,336,062 A | 8/1994 | Richter |
| 5,486,335 A | 1/1996 | Wilding et al. |
| 5,624,539 A | 4/1997 | Ewing et al. |
| 5,824,233 A | 10/1998 | Zettler |
| 5,846,396 A | * 12/1998 | Zanzucchi et al. |
| 6,106,685 A | * 8/2000 | McBride et al. |

* cited by examiner

*Primary Examiner*—Jan Ludlow

(57) ABSTRACT

A microfluidic device has a layer with a capillary break formed by a capillary sluice. The capillary sluice has a lower surface and an upper surface. A first electrode is disposed on the lower surface. The first electrode is coupled to the voltage source. A second electrode spaced a predetermined distance from the first electrode is coupled to the voltage source. A controller may be used to control the voltage applied to the electrodes. The controller may alter the operation of the microfluidic chip in response to fluid sensed at the electrodes.

14 Claims, 2 Drawing Sheets

METHOD OF MOVING AND DETECTING FLUID IN A MICROFLUIDIC DEVICE

TECHNICAL FIELD

The present invention relates to microfluidic devices, and more particularly, to the moving and detecting fluids with respect to a microfluidic device.

BACKGROUND OF THE INVENTION

Methods of making a homologous series of compounds, or the testing of new potential drug compounds comprising a series of light compounds, has been a slow process because each member of a series or each potential drug must be made individually and tested individually. For example, a plurality of potential drug compounds that differ perhaps only by a single amino acid or nucleotide base, or a different sequence of amino acids or nucleotides are tested by an agent to determine their potential for being suitable drug candidates.

The processes described above have been improved by microfluidic chips which are able to separate materials in a micro channel and move the materials through the micro channel is possible. Moving the materials through micro channels is possible by use of various electro-kinetic processes such as electrophoresis or electro-osmosis. Fluids may be propelled through various small channels by the electro-osmotic forces. An electro-osmotic force is built up in the channel via surface charge buildup by means of an external voltage that can repel fluid and cause flow.

In fluid delivery in microfluidic structures, several layers comprise the device. Channels often extend between the various layers. A capillary break structure is used in place of a valve downstream of an electrohydrodynamic pump in a channel. The capillary break is a location where the small channel ends abruptly as the entrance to a larger space. Capillary forces pull the fluid up to the end of the small cross-section channel but not beyond. This stops the fluid flow until additional pressure is provided. Prior to pushing fluid beyond the capillary break, a gap or discontinuity occurs in the fluid path immediately downstream of the capillary break. This prevents cross-contamination from other fluid paths.

In some instances, an electrohydrodynamic pump generates a relatively low pressure and may not be able to overcome the capillary break without an additional pressure applied. Also, size, uniformity, and other fabrication tolerances cause variances in the effectiveness of electrohydrodynamic pumps. Also, the mircofluidic chip is preferably designed to be used with several different types of fluid. The variation of fluid properties, such as composition and temperature, also affect the ability of an electrohydrodynamic pump to overcome the capillary break.

Another difficulty in using capillary breaks is knowing whether or not the capillary break has actually been overcome. It is currently assumed that if a sufficient amount of pressure is provided that the capillary break is overcome. But as mentioned above, fabrication tolerances and functional characteristics may vary due to each capillary break. Thus, some capillary breaks may actually not be overcome. Likewise, it would be desirable to know whether or not a capillary break has been cleared.

It would, therefore, be desirable to enable a capillary break to be overcome for various fabrication tolerances and fluids used within the microfluidic device. It would also be desirable to sense the proper operation of a capillary break.

SUMMARY OF THE INVENTION

It is, therefore, one object of the invention to provide an improved fluid delivery mechanism to an array of reaction wells.

It is a further object of the invention to reliably overcome a capillary break in spite of manufacturing tolerances.

In one aspect of the invention, a microfluidic device has a layer with a capillary break formed by a capillary sluice. The capillary sluice has a lower surface and an upper surface. A first electrode is disposed on the lower surface. The first electrode is coupled to the voltage source. A second electrode spaced a predetermined distance from the first electrode coupled to the voltage source.

One advantage of the invention is that feedback from the electrodes may be used by the controller and the software therein to adjust the operation of the microfluidic device.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

Figure 1:
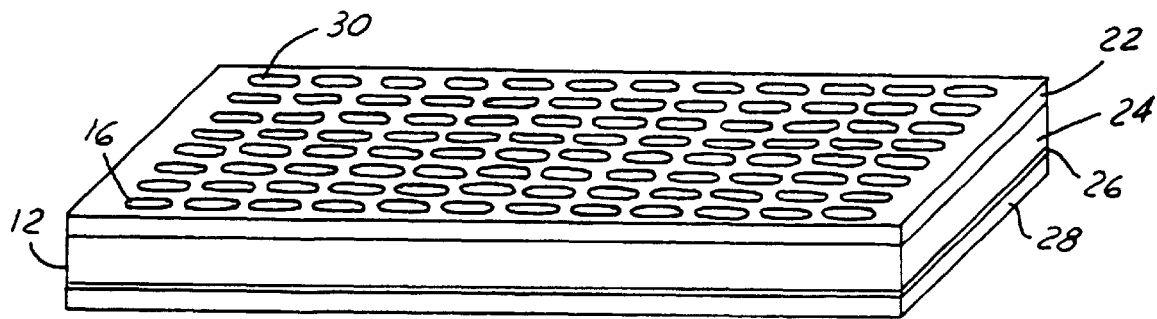
FIG. 1 is a schematic view of a fluid distribution system network formed according to the present invention.
Figure 2:
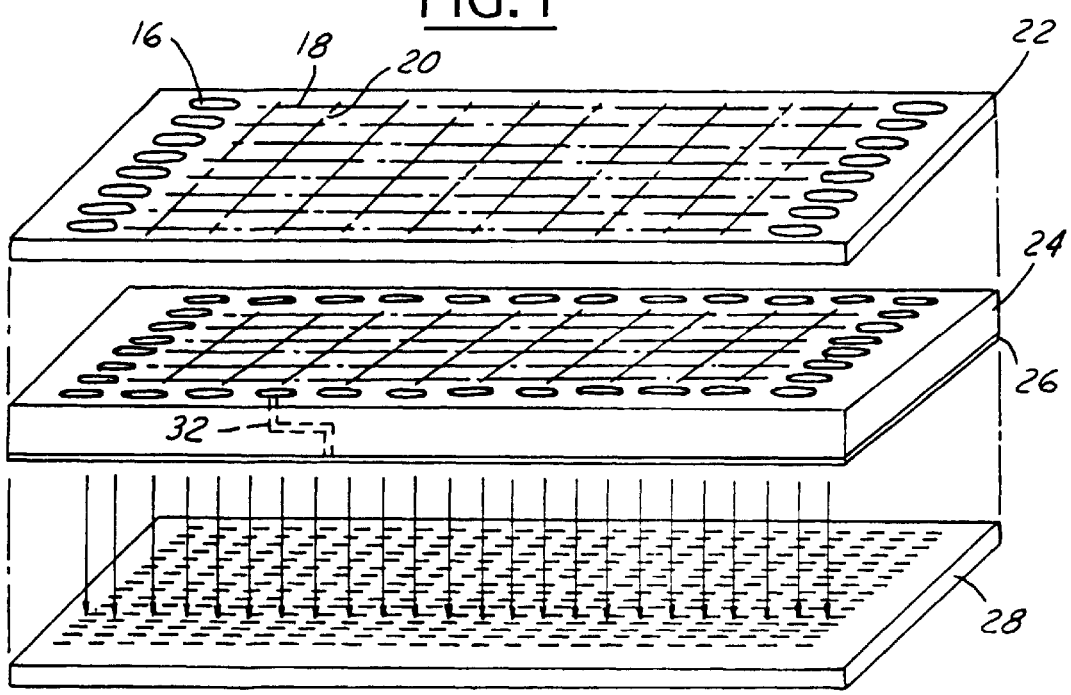
FIG. 2 is a cross-sectional view along line 2—2 of FIG. 1.

Referring to FIGS. 1 and 2, a microfluidic distribution system 10 is shown incorporated into a microfluidic device 12.

Fluid distribution system 10 has fluid inputs 16 coupled to a fluid source (not shown). Fluid inputs 16 are coupled to a main channel 18. Main channel 18 has a plurality of branches 20 extending therefrom. Main channel 18 is coupled to a fluid (not shown) that directs fluid outside of microfluidic device 12, which has not been diverted by one of the plurality of branches 20.

The fluid source is preferably a pressurized fluid source that provides pressurized fluid to main channel 18. Various types of pressurized fluid sources would be evident to those skilled in the art.

Microfluidic device 12 is preferably comprised of a plurality of adjacent layers. In the present example, a top layer 22, a second layer 24, a seal layer 26 and a well layer 28 are used. The composition of each layer may, for example, be glass, silicon, or another suitable material known to those in the art. Each layer may be bonded or glued together in a manner known to those skilled in the art. For example, the layers may be anodically bonded.

Second layer 24 is illustrated as single layer. However, second layer 24 may be comprised of several layers interconnected through fluid channels. Although only one seal layer 26 is shown for simplicity, one skilled in the art would recognize that a seal layer may be used between any of the layers.

Branches 20 provide interconnections to well layer 28 through the various layer 24. The various openings and channels forming branches 20 may be formed in a conventional manner, such as by etching or drilling. Drilling may be accomplished by laser drilling.

Main channel 18 in the preferred embodiment is defined by first layer 22 and second layer 24. A cell feed 30 is formed between top layer 22 and within second layer 24. Cell feed 30 is coupled to main channel 18 through interlayer feed channel 32. Interlayer feed channel 32, as illustrated, is conical in shape. However, interlayer feed channel 32 may also be cylindrical in shape.

Figure 3:
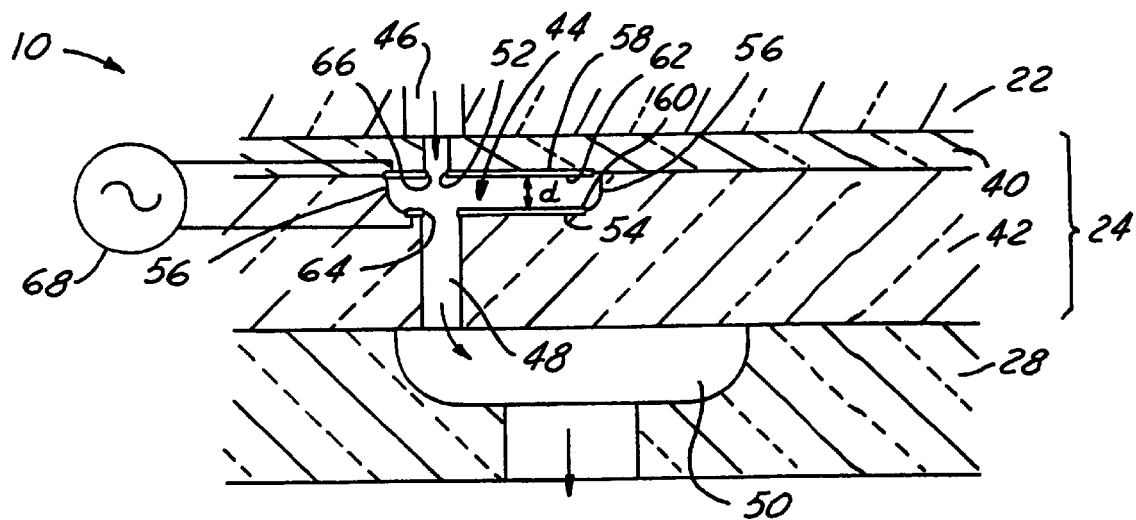
FIG. 3 is cross sectional view of an apparatus according to the present invention.

Referring now to FIG. 3, a cross-sectional view of a first embodiment of the present invention is illustrated. A portion of microfluidic device 10 is shown. In this example, second layer 24 is comprised of two layers 40 and 42 each of which are preferably a dielectric material. A sluice 44 is defined by layers 40, 42. Sluice 44 receives fluid from an input capillary channel 46. Fluid is removed from sluice 44 through an output capillary channel 48. Output capillary channel 48 may provide fluid to a well 50 within well layer 28. A capillary break 52 is formed at the interface between layers 40 and 42. That is, as fluid within capillary channel 46 reaches the larger space of sluice 44, additional forces must be provided that are greater than the capillary forces within the fluid in input capillary channel 46.

Layer 42 defines a portion of sluice 44. That is, layer 42 defines bottom surface 54 and side surfaces 56 of sluice 44. Layer 40 defines an upper surface 58 of sluice 44.

To form a fluid detecting means and a means for moving fluid through capillary break 52, a first electrode 60 is disposed upon bottom surface 54. Spaced apart from first electrode 60, a second electrode 62 is spaced apart therefrom. Second electrode 62 is disposed upon upper surface 58. As will be further described below, the position of second electrode 62 is preferably upstream from first electrode 60. In this embodiment, first electrode 60 and second electrode 62 form plates. The plates formed by first electrode 60 and second electrode 62 extend substantially across bottom surface 54 and upper surface 58 respectively. First electrode 60 may encircle an exit opening 64. Likewise, second electrode 62 may encircle an entrance opening 66 to sluice 44. First electrode 60 and second electrode 62 are preferably formed of an electrically conductive material such as copper and have substantially the same surface area. First electrode 60 and second electrode 62 are separated by a distance d. In the operation of the apparatus, the ratio of the area of the smallest of first electrode 60 and second electrode 62 versus the distance d is preferably greater than about 10. As the aspect ratio increases, the edge effects become important due to non-uniformities in the electric field.

As shown, first electrode 60 and second electrode 62 are exposed within sluice 44. That is, first electrode 60 and second electrode 62 contact the fluid within sluice 44. First electrode 60 and second electrode 62 also may be partially imbedded within respective layers 40, 42 or coated with a dielectric material as will further be described below.

A voltage source 68 is electrically coupled to first electrode 60 and second electrode 62. Voltage source 68 is preferably a direct current source. However, an alternating current voltage source may also be used. The magnitude of the voltage supplied by voltage source 68 should be sufficient enough to provide a potential difference between first electrode 60 and second electrode 62 of sufficient magnitude to overcome capillary break 52. Also, the magnitude of voltage from voltage source 68 should be of a sufficient magnitude to allow fluid sensing between first electrode 60 and second electrode 62 as will be further described below.

Figure 4:
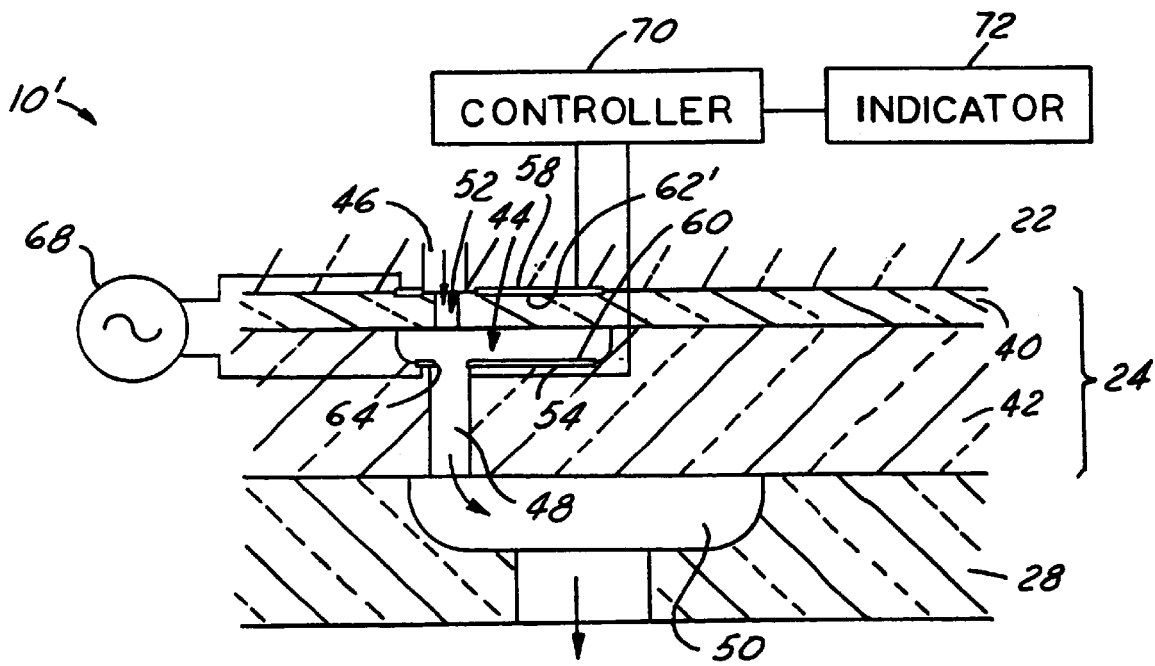
FIG. 4 is a partial cross sectional view of an alternative embodiment of an apparatus according to the present invention.

Referring now to FIG. 4, a second embodiment of a microfluidic device 10' is illustrated. Common elements from FIG. 3 have been given the identical reference numeral in FIG. 4. In this embodiment, second electrode 62' is located upstream in input capillary channel 46. Second electrode 62' may, for example, be formed between first layer 22 and layer 40. It should be noted that in this embodiment, second electrode 62' is positioned so that it will not contact fluid within input capillary channel 46. The dielectric material of layers 22, 40, 42 surrounds and thus encapsulates second electrode 62'. Depending on the composition of the materials used within the microfluidic device, providing a dielectric layer will prevent electrodes 60, 62 from participating in a chemical reaction with the fluids in microfluidic device 10.

First electrode 60 and second electrode 62' may also be coupled to a controller 70. Controller 70 is used to control the operation of microfluidic device. Controller 70 may, for example, be microprocessor based. When a voltage is applied across first electrode 60 and second electrode 62', controller 70 may be used to sense an electrical characteristic therebetween. Controller 70 may, for example, be used to sense capacitance between first electrode 60 and second electrode 62. A controller 70 may also be incorporated into the embodiment shown in FIG. 3. In that case, controller 70 may also be used to sense the electrical characteristic of current between first electrode 60 and second electrode 62 since each of the electrodes contacts fluid.

An indicator 72 is coupled to controller 70. Indicator 72 may be used to provide an operator of microfluidic device 10 feedback as to the proper operation of capillary break 52. Indicator 72 may, for example, be a light emitting diode (LED), a screen indicator or an audible indicator such as a warning bell. A screen indicator may indicate on a computer screen that a fault has occurred and the location of the fault for diagnostic purposes.

In operation, when fluid has filled input capillary channel 46 to capillary break 52, a voltage may be applied across first electrode 60 and second electrode 62. If a sufficient voltage is applied across the electrodes, fluid from input capillary channel will flow into sluice 44. Fluid will then flow from sluice 44 through output capillary channel 48 and into well 50. The operation of first electrode 60 and second electrode 62 may also be used to sense a capacitance or other electrical characteristics therebetween. Feedback may be provided to a controller 70 to verify the operation of capillary break 52. Controller 70 may alter the operation of microfluidic device in response to the sensed conditions between first electrode 60 and second electrode 62. Controller 70 may also provide an indication to indicator 72 as to the proper operation of capillary break 52. Indicator 72 may then provide a visual or audible indication to the microfluidic operator.

While particular embodiments of the invention have been shown and described, numerous variations and alternate embodiments will occur to those skilled in the art. Accordingly, it is intended that the invention be limited only in terms of the appended claims.

What is claimed is:

1. A microfluidic chip coupled to a voltage source comprising:

a layer having a capillary break formed by a capillary sluice, said capillary sluice having a lower surface and an upper surface;

a first electrode disposed on said lower surface, said first electrode coupled to the voltage source; and, a second electrode spaced a predetermined distance from said first electrode coupled to the voltage source, said second electrode is disposed adjacent to an input capillary channel.

2. A microfluidic chip as recited in claim 1 wherein said fir electrode is encapsulated in a dielectric material.

3. A microfluidic chip as recited in claim 1 wherein said first electrode comprises a first plate.

4. A microfluidic chip as recited in claim 1 wherein said second electrode comprises a second plate.

5. A microfluidic chip system coupled to a voltage source comprising:
- a layer having a capillary break formed by a capillary sluice, said capillary sluice having a lower surface and an upper surface;
- a first electrode disposed on said lower surface, said first electrode coupled to the voltage source;
- a second electrode spaced a predetermined distance from said first electrode coupled to the voltage source; and,
- a controller coupled to the first electrode and second electrode, said controller sensing the presence of fluid within said capillary sluice in response to an electrical characteristic between said first electrode and said second electrode.

6. A microfluidic chip system as recited in claim 5 wherein the electrical characteristic is capacitance.

7. A microfluidic chip system as recited in claim 5 wherein the electrical characteristic is current.

8. A microfluidic chip system as recited in claim 5 further comprising an indicator coupled to said controller, said indicator indicating the presence of fluid within said sluice in response to the controller.

9. A microfluidic chip system as recited in claim 5 wherein said second electrode is disposed on said upper surface.

10. A microfluidic chip system as recited in claim 5 wherein said second electrode is disposed adjacent to an input capillary channel.

11. A microfluidic chip system as recited in claim 5 wherein said second electrode is disposed substantially adjacent to the upper surface.

12. A microfluidic chip system as recited in claim 5 wherein said first electrode is encapsulated in a dielectric material.

13. A microfluidic chip system as recited in claim 5 wherein said first electrode comprises a first plate.

14. A microfluidic chip system as recited in claim 5 wherein said second electrode comprises a second plate.

* * * * *